UNITED STATES PATENT OFFICE.

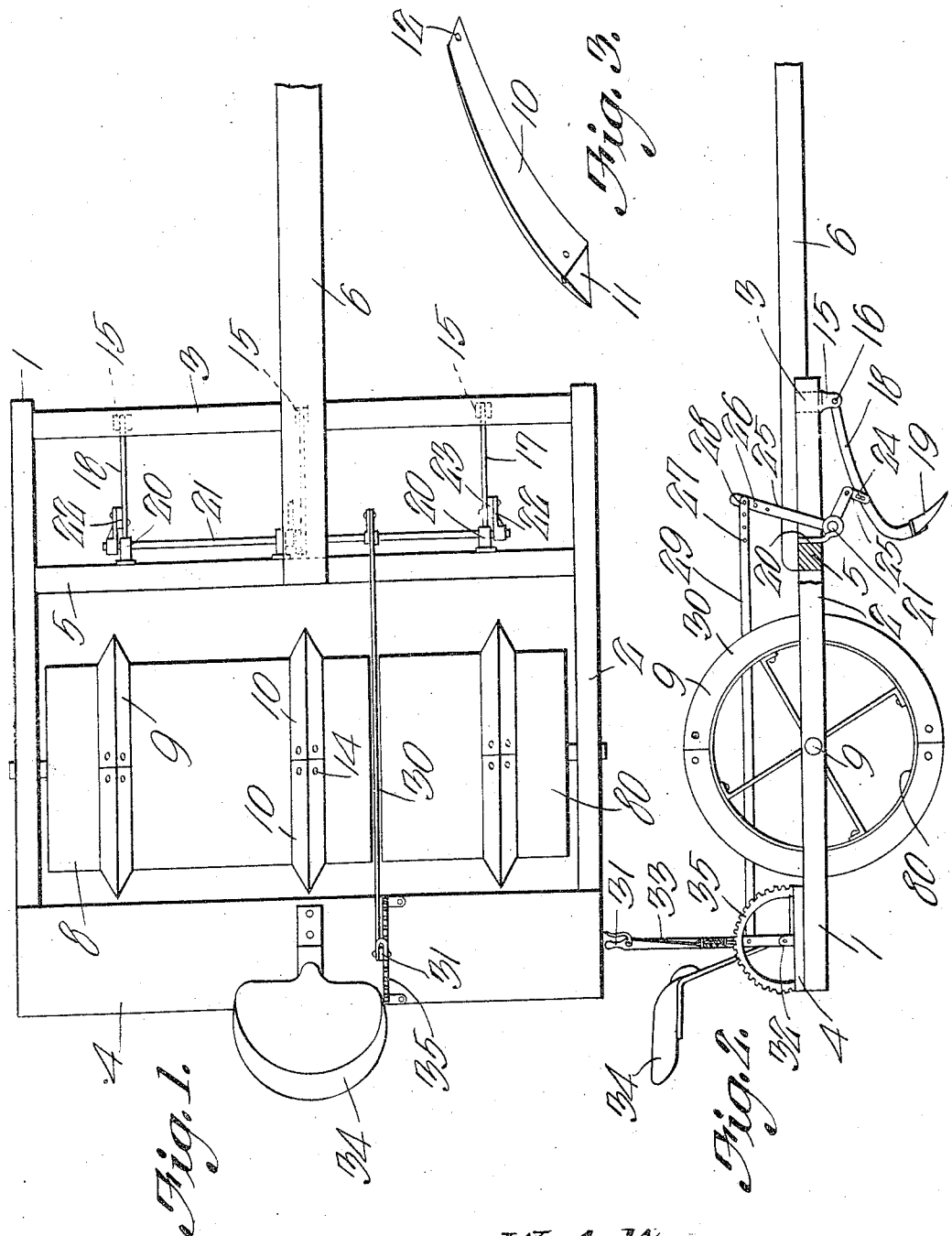

WELADS ANDRA WILSON, OF NORTH YAKIMA, WASHINGTON.

COMBINED ROLLER AND DITCHER.

1,014,733.  Specification of Letters Patent.  Patented Jan. 16, 1912.

Application filed August 1, 1911. Serial No. 641,873.

*To all whom it may concern:*

Be it known that I, WELADS A. WILSON, a citizen of the United States, residing at North Yakima, in the county of Yakima and State of Washington, have invented a new and useful Combined Roller and Ditcher, of which the following is a specification.

The device forming the subject matter of this application, is a combined land roller and ditcher, adapted to be employed for the fashioning of shallow trenches, which are commonly made for irrigation purposes.

The objects of the invention are, to assemble, in operative relation to each other, a plurality of shovel plows, and a ribbed roller, the construction being such that the shovel plows will open the trenches, the ribs upon the roller giving the ditches the proper slant, and those portions of the roller which lie between the ribs, serving to compact the soil between the ditches or trenches.

A further object of the invention is to provide novel means for raising and lowering the shovel plows, and to improve and strengthen generally, the construction of devices of the type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in top plan; Fig. 2 is a side elevation; and Fig. 3 is a detail perspective of one of the ribs which circumscribe the rollers.

In carrying out the invention there is provided, as a primary and fundamental element, a frame, denoted generally by the numeral 1. The frame 1 may be fashioned of any desired material, and may be of any shape. Preferably, however, as shown, it is of rectangular contour, and comprises side bars 2, connected at their forward ends by a cross bar 3, and at their rear ends by a cross board 4. Between the cross bar 3 and the board 4, the side bars 2 are connected by an intermediate brace 5.

The structure may be propelled in any desired manner. In the present instance, it is assumed that draft animals will be employed, and with this end in view, a tongue 6 is united with the front cross bar 3 and with the intermediate brace 5.

Mounted in the side bars 2, between the intermediate brace 5 and the board 4, is a shaft 7, carrying two or more rollers, denoted by the numerals 8 and 80. The rollers are circumscribed by any desired number of outstanding ribs, denoted generally by the numeral 9, the ribs being constructed in any preferred manner. Referring particularly to Fig. 3, it will be noted that the ribs 9 consist of several sections, denoted by the numeral 10. As shown at 11 in Fig. 3, the ribs are preferably triangular in cross section. The ribs may be assembled with the rollers in any way; if desired, openings 12 may be fashioned in the sections 10 of the ribs, and through these openings 12 may be passed securing members 14, engaging with the rollers 8 and 80.

Fixed to and depending from the cross bar 3, are a plurality of hangers 15, to which are pivoted, as shown at 16, the forward ends of shovel plows, denoted generally by the numeral 17. The shovel plows 17 are alined with the ribs 9, so that when the shovel plows open the trenches, the ribs upon the rollers will serve to compact the side walls of the trenches giving the same the proper slant. Obviously, those portions of the rollers 8 and 80 which lie between the circumscribing ribs 9, serve to compact the soil between the trenches.

In a more detailed description, the plows consist of goose necks 18, the forward ends of which are pivoted to the hangers 15. At their lower, rear ends, the goose necks 18 carry pointed blades 19.

Secured to the forward face of the intermediate brace 5, are a series of bearings 20, in which is journaled for rotation a shaft 21, provided with a series of rigid, depending arms 22, the same being forwardly extended. To the forward ends of the arms 22 are pivoted the upper ends of links 23, united adjacent their lower ends by means of a pin and slot connection 24, with the goose necks 18. The slot of the pin and slot connection 24 is preferably located in the link 23, the pin portion of the connection being preferably secured to the goose neck 18.

Fixed to and rising from the shaft 21, is an arm 25, provided with a series of openings 26, adapted to be alined successively with openings 27 in a rearwardly extended operating member, preferably taking the form of a bar 29, a connecting element 28 being extended through the openings which are thus alined, to form a pivotal union between the upstanding arm 25 of the shaft 21 and the operating member 29. As denoted by the numeral 30, the operating member 29 passes between the adjacent ends of the rollers 8 and 80, the rear end of the operating member 29 being pivotally connected with a lever 31, fulcrumed adjacent its lower end, as shown at 32, upon the board 4. The lever 31 is equipped with suitable latch mechanism 33, adapted to engage with a segment 35, secured to the board 4, and located adjacent the driver's seat 34, which seat 34 is carried by the board 4.

By mounting the connecting element 28 successively in the openings 26 and 27, the position and the throw of the arm 25 may be adjusted. Obviously, the latch mechanism 33, coöperating with the segment 35, serves to retain the plow-operating mechanism in adjusted positions. When the shaft 21 is rotated, through the instrumentality of the lever 31, the forward ends of the arms 22 will be lifted, the arms, through the instrumentality of the links 23, serving to effect a raising and a lowering of the goose necks 18, and a consequent raising and lowering of the blades 19 of the plows. Owing to the fact that the goose necks 18 are connected with the links 23 by the loose, pin and slot connection 24, some play will be allowed in the shovel plows 17, should the same strike a stump, a rock, or like obstruction, during the plowing operation.

It will be readily understood that when the device is drawn forward over the ground, the plow blades 19 will open the trench, the walls of the trenches being slanted properly by the ribs 9, those portions of the rolls 8 and 80 which lie between the ribs 9, serving to compact the soil between the trenches.

Having thus described the invention, what is claimed is:—

1. A device of the class described comprising a frame; rollers journaled for rotation in the frame; ribs circumscribing the rollers and outstanding therefrom; an operating member located between the rollers; lever mechanism carried by the frame, to the rear of the rollers, and operatively united with the operating member; a shaft journaled for rotation in the frame, in advance of the rollers, and provided with an upstanding arm, pivotally connected with the forward end of the operating member; secondary arms outstanding from the shaft; shovel plows pivotally supported adjacent their forward ends upon the frame, and alined with the ribs; and links pivotally connected with the secondary arms, the lower ends of the links being loosely connected with the shovel plows.

2. A device of the class described comprising a frame; rollers journaled for rotation in the frame and provided with circumscribing ribs; a shaft journaled for rotation in the frame, in advance of the rollers; an upstanding primary arm upon the shaft; an operating member located between the rollers, the forward end of the operating member, and the primary arm being provided with a plurality of openings, adapted to be alined; a securing element adapted to be inserted in the alined openings; latch and lever mechanism operatively connected with the rear end of the operating member; secondary arms forwardly extended from the shaft; goose necks pivoted to the forward portion of the frame and provided at their lower ends with earth-engaging blades, alined with the ribs; and links pivotally connected at their upper ends with the secondary arms, the lower ends of the links being united by a pin and slot connection, with the intermediate portions of the goose necks.

In testimony that I claim the foregoing as my own, I have hereto affixed my signature in the presence of two witnesses.

WELADS ANDRA WILSON.

Witnesses:
 HENRY PAULIN,
 F. G. THOMPSON.